Dec. 31, 1957 S. J. HARRIS ET AL 2,818,467
TELEVISION FILM SCANNER HAVING SPROCKET HOLE SENSING MEANS RESPONSIVE TO FILM REFRACTION BETWEEN HOLES
Filed Nov. 10, 1951 2 Sheets-Sheet 1
FIG. I.
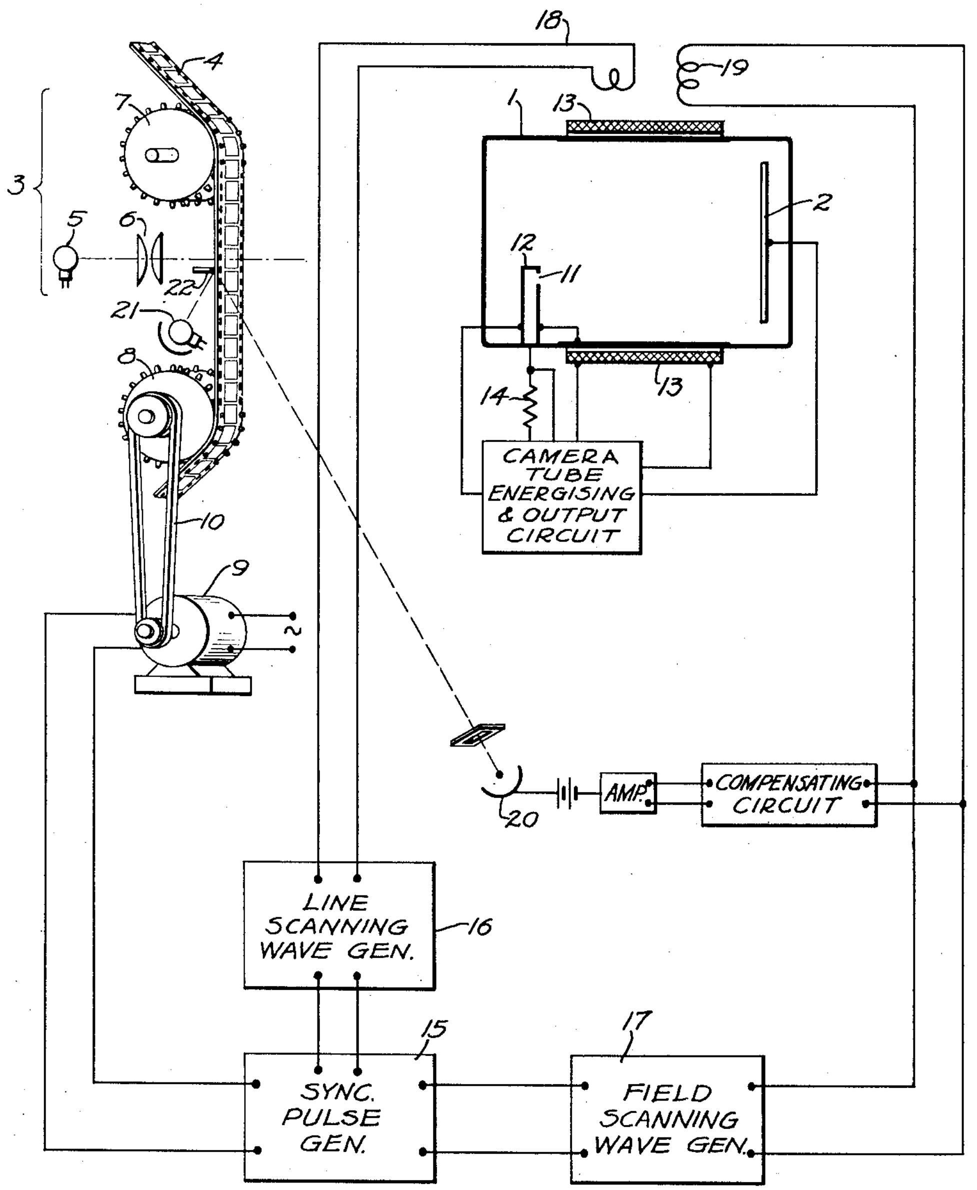
INVENTOR.
S. J. HARRIS
BY J. A. HENDERSON.
ATTORNEY Dec. 31, 1957 S. J. HARRIS ET AL 2,818,467

TELEVISION FILM SCANNER HAVING SPROCKET HOLE SENSING MEANS RESPONSIVE TO FILM REFRACTION BETWEEN HOLES

Filed Nov. 10, 1951 2 Sheets-Sheet 2

INVENTOR.
S. J. HARRIS
BY J. A. HENDERSON
R. P. Morris
ATTORNEY 2,818,467

TELEVISION FILM SCANNER HAVING SPROCKET HOLE SENSING MEANS RESPONSIVE TO FILM REFRACTION BETWEEN HOLES

Samuel J. Harris and J Alvin Henderson, Fort Wayne, Ind., assignors to International Telephone and Telegraph Corporation, a corporation of Maryland Application November 10, 1951, Serial No. 255,768

9 Claims. (Cl. 178—7.2)

This invention relates to motion picture television transmission systems and particularly to an arrangement in such systems for controlling the relative movement between the projected image on a camera tube and the scanning trace.

In the television system where motion picture images are transmitted, the time relationship between the projection of the image on the camera tube and the scanning trace becomes of utmost importance and it is in this region of the art where a great deal of difficulty occurs. Many arrangements have been proposed for synchronizing the scanning trace and the projected image; some requiring expensive equipment, such as a cathode ray tube for scanning the sprocket holes of the film at a high rate relative to the film movement; the scanning beam being modulated by the sprocket hole edge so that a resulting signal in the form of a series of pulses is produced to yield positional information. Mechanical systems have also been contrived but were inherently defective and unsatisfactory in operation because of wear and play between the parts.

It is the object of this invention to provide a simple optical-electronic arrangement for continuously controlling the relative movement between the projected image on the camera tube and the scanning trace.

A feature of our invention is a simple and unique optical system providing positional information of the film, and utilizing the sprocket holes as the source for obtaining this information.

Generally, in the television transmission system, the transport time between successive frames of film in the motion picture projector is greater than the blanking period between two successive fields in a camera tube. Therefore, provision must be made to compensate for the movement of the projected image during a part of the scanning period. Applicants compensate for this movement by shifting the scanning trace in accordance with the movement of the image, thereby eliminating any relative movement which would have normally occurred. In accordance with the broadest aspect of the invention, applicants provide an arrangement comprising a first means for initiating vertical shifting of the scanning trace in either direction away from the normal pattern, a second means made effective when the film is in a first position, and third means responsive to said second means when the film is in the first position to control said first means to trace a given portion of the frame in accordance with the image movement during the transport period.

Applicants' optical system for deriving positional information from the film, comprises in its broadest aspect, a light beam source and means for producing relative movement between the beam and the film. Thus, when the film is in a first position, a sprocket hole in the film is aligned with the beam so that the beam passes therethrough and extends along a given path. Positioned in the path of the light beam is a light responsive means adapted to produce a signal upon excitation by the beam; however, when the film is located in other positions the light beam strikes the film itself and is refracted from said path.

The above and other features and objects of this invention and the manner of attaining them will become more apparent and the invention itself will be best understood by reference to the following description of an embodiment of the invention taken in conjunction with the accompanying drawings, in which:

Fig. 1 illustrates a motion picture television transmission system, a part of which is shown diagrammatically;

Figure 3:
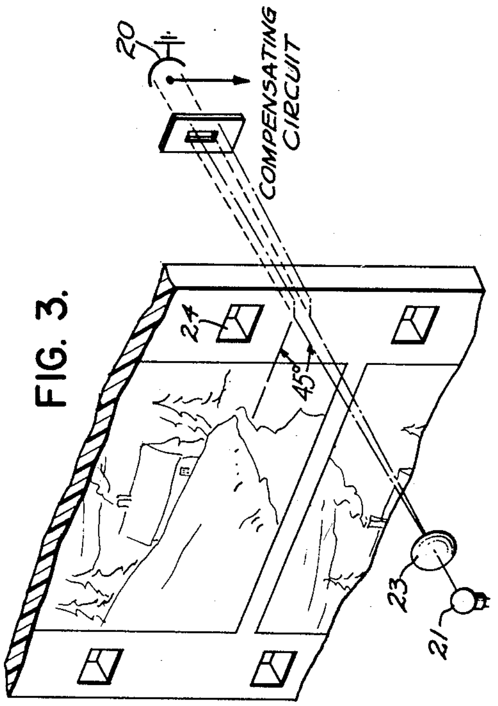
Figs. 2 and 3 illustrate the principle of the optical switching system.

It is to be understood that although the invention is described in connection with the image dissector, other camera tubes, such as the iconoscope, orthicon, etc. may be satisfactorily employed. Further, it is to be realized that in combination with the camera tube, any of the presently used projectors may be employed. However, for ease of discussion, the intermittent type projector will be explained in connection with the invention.

Referring to Fig. 1, there is illustrated a camera tube, which by way of example, is an image dissector tube 1 having a photo-sensitive cathode 2.

An intermittent film projector generally indicated at 3 projects successive images of intermittently moving film 4 on cathode 2. The light from light source 5 is projected by a lens system 6 through film 4 and focussed on the cathode 2. Film 4 is guided over sprocket gear 7 and drive sprocket 8 which is driven by an electric motor 9 through pulley drive 10.

The light focussed on cathode 2 will liberate photo-electrons which are accelerated toward aperture 11 in anode finger 12. Anode 12 and cathode 2 are provided with the usual energizing circuit (diagrammatically illustrated) supplying the proper voltages thereto. Focussing coil 13 is suitably energized in accordance with the tube characteristics and focusses the photo-electrons on aperture 11 of anode 12. Preferably the photo-electrons passing through aperture 11 are multiplied by an electron multiplier (not shown) contained within the anode 12 and the output signal may be developed across a resistor 14 connected to the collector stage of the multiplier.

Electric motor 9 is preferably synchronized by energizing its field coils from the synchronizing pulse generator 15 which is arranged to develop synchronizing pulses at the line and field frequencies. Accordingly, line scanning wave generator 16 and the field scanning wave generator 17 are both synchronized by the pulse generator 15. Line scanning wave generator 16 is connected to the line deflecting coils 18 while field scanning wave generator 17 is connected to the field deflecting coils 19. Through the combined action of the magnetic deflecting fields developed by deflecting coils 18 and 19, the photo-electrons liberated from cathode 2 are swept past aperture 11 horizontally in accordance with the line scanning frequency and vertically in accordance with the field frequency. The vertical deflection of the photo-electrons therefor is in the direction parallel to the direction of the movement of film 4.

In accordance with the present invention the field coil 19 of the dissector is pulsed in synchronism with the movement of film 4 while it is moving in the film gate, thus eliminating the relative movement between the projected image and the vertical scanning trace.

A light responsive means, such as photocell 20, has its output connected to the vertical deflecting coil 19 over an amplifier and a known form of compensating circuit.

Photocell 20 is periodically energized by an optical switching system comprising, in its broadest form, a light beam source 21 directed at a refractive angle toward said film so as to pass unobstructed through the sprocket hole of the frame immediately before, or after, the frame is fully gated. At all other times when the sprocket hole is not aligned with the beam, the beam is refracted in passing through the film base. Photocell 20 is positioned to be in the path of only the direct beam and out of the path of the refracted beam. Therefore, the optical switch, in this form, may be considered to be effective just before and/or after gating and ineffective at all other times. For convenience in construction, a mirror 22 may be positioned on either side of the film and axially parallel to the direction of the film, hence light in this case is directed at the mirror and then reflected (when aligned with the sprocket hole) to photocell 20.

Figure 2:
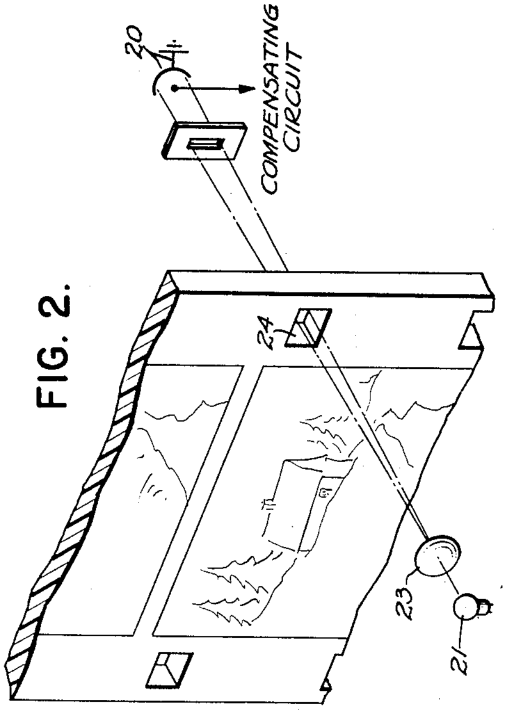

The principle of our optical switch may be best understood with reference to Figs. 2 and 3 in which the mirror has been omitted for the sake of simplicity. Referring first to Fig. 2, the light source 21 is condensed by a suitable condensing lens 23 into a narrow beam having a height substantially equal to the length of a sprocket hole 24, and directed at a refractive angle toward said film. Positioned in the path of the light beam is photocell 20. Therefore, when the sprocket hole passes through a first given position, the light passes therethrough unobstructed and the photocell output builds up to maximum amplitude in one sprocket hole length and then reduces to zero in another length. The length of the film to the succeeding sprocket hole is then traversed with no further information. However, during the traversing of the film between sprocket holes, the light beam is refracted in passing through the film base, and is out of the path of the photocell. In Fig. 3 the thickness of the film is exaggerated to show the phenomenon of refraction more clearly. By way of example, a beam of light 50 mils in height, which is equal to the length of a sprocket hole, and a ½ mil in width, may be viewed by a ½ mil scanning microscope photocell. If the light beam is at an angle of the order of 45° with the film, the beam is optically displaced laterally about one mil and will thus miss the microscope slit.

Figure 4C:
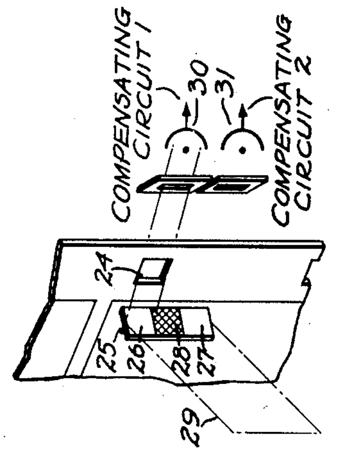
Figs. 4A–4C illustrate another arrangement of the optical switching system of this invention.
Figure 4B:
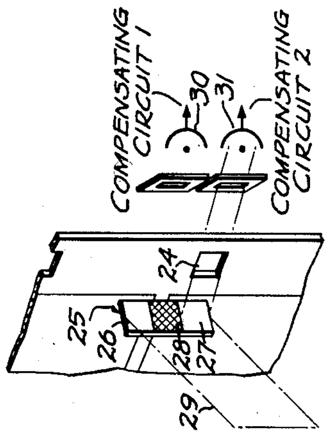
Figure 4A:
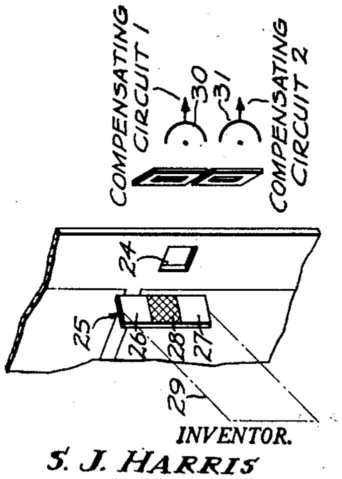

In another arrangement of applicants' invention illustrated in Figs. 4A–C which permits more exact control, a segmented mirror 25 is provided having upper and lower reflective portions 26 and 27 respectively, and a non-reflecting portion, or light absorptive portion 28, centrally located therebetween. The length of each of said portions is substantially equal to the length of a sprocket hole so that the upper and lower portions of a light beam 29 are separated by a distance substantially equal to the length of a sprocket hole; the beam 29 originally being at least as long as mirror 25. A pair of microscope photocells 30 and 31 are positioned in the paths of light reflected from the upper and lower portions 26 and 27 respectively. Photocell 30 has its output connected to a first compensating circuit to shift the vertical trace in a first predetermined manner, and photocell 31 has its output connected to a second compensating circuit to shift the vertical trace in a second predetermined manner. The axis of the mirror may be located parallel with the direction of the film, so that the sprocket hole from which the information is to be obtained moves successively in optical alignment with the portions of the mirror 26, 28 and 27.

In accordance with the second arrangement, the system is initially aligned so that with the film stationary (as in the intermittent projector) or when the projected image appears stationary (as in the continuous projector), a sprocket hole is optically aligned with the non-reflective portion of said mirror (Fig. 4A).

The transport of the film through the projector is timed with the camera tube so that pull down occurs synchronously with a given blanking signal. However, only approximately ⅔ of the pull down transition can be completed within the duration of the blanking signal therefore, ⅓ of the pull down time must be compensated for in the camera tube to eliminate the relative movement which would occur without compensation.

Since a sprocket hole is associated with each of the picture frames, it has been found that the sprocket holes are a good source of positional information on the standard film. The sprocket hole furnishing the information is preferably the one on the frame being projected.

To obtain positional information from the sprocket hole during one-third of the pull down cycle, the mirror 25 or other means of obtaining a fine serrated line of light, is placed on either side of film and suitably positioned with respect to the sprocket hole. The beam of light 29, from the mirror to the photocells 30, 31, forms a refractive angle with the film; thus when the light beam travels through the film, the beam is optically displaced laterally and will miss the miscroscope photocell slit.

Assuming that a cycle of operation starts with a picture frame fully gated and the film stationary, the sprocket hole of the frame will be aligned with the absorptive portion 28 of the mirror, thus passing no light therethrough, and the beams from the reflective portions 26, 27 are refracted out of the paths of photocells 30, 31; therefore, the photocells do not supply a signal while the film is in this position. This is consistent with the theory of operation because the film is stationary and therefore no relative movement exists between the projected image and the scanning trace. The projector is synchronized so as to start pull down toward the end of the vertical scan. As soon as the film starts to move from its fully gated position, relative movement occurs and the sprocket hole traverses the lower reflective portion 27 (Fig. 4B) thereby permitting light to pass to photocell 31 which supplies a signal over the compensating circuit to the vertical deflection coil to shift the trace in accordance with the movement of the film. The signal from photocell 31 will indicate the amount of correction during the first sixth of the pull down. Then, two-thirds of the pull down occurs synchronously with the blanking signal, and the last sixth is compensated for through photocell 30. In this case the film has not reached its final position and the sprocket hole uncovers reflective portion 26, thereby permitting light to pass to photocell 30 (Fig. 4C) which supplies a signal over its compensating circuit to the vertical deflection coil to shift the trace in accordance with the last sixth of the movement of film. Compensating circuits for supplying pulses to the deflection coil for shifting the scanning trace in a desired direction are well known to the art and form no part of the novelty in this invention. For example, the compensating circuit may supply a preformed wave synchronized with pull down and the photocell signal will be used as a second order correction.

An advantage of this system is that any overshoot, or vertical oscillation will be picked up by the photocells and the irregularity corrected accordingly.

A single mirror and photocell may also be used with good results. In this arrangement reflective portion 26 alone may be used with photocell 30 to compensate for the last sixth of the pull down cycle or reflective portion 27 with photocell 31 may be used to detect the first sixth of pull down. Although this arrangement is more economical, it does not fully compensate for irregular vertical movements in the film.

It is understood, of course, that instead of a segmented mirror, a collimated beam, having the center portion blacked out, may be used. Further it is realized that our system may be used with the known standard film sizes, e. g. 16 mm., and 35 mm., and is not limited thereby.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A system for deriving information from the position of the sprocket holes in the film in a motion picture projector, comprising means for producing a light beam, means for producing relative movement between the beam and the film, means directing said light beam at a refractive angle toward said film, the film in one position having the sprocket hole in line with the beam so that the beam passes therethrough and extends along a given path, a light responsive means in said path and adapted to produce a signal upon excitation by the light beam, and the film in the other positions located so that the beam strikes the film itself and is refracted along a second path which misses said light responsive means.

2. The system according to claim 1, wherein said light beam is directed at a mirror, and reflected therefrom to said light responsive means only when the sprocket hole is in said one position.

3. A system for deriving information from the position of the sprocket holes in the film in a motion picture projector, said film having a first position when a picture frame is fully gated and the projected image appears stationary, and having second and third positions immediately before and after the gated position respectively, said position system comprising a mirror divided into three portions, the upper and lower portions being reflective and the center portion non-reflective, means for producing a thin beam of light and directing said beam toward said mirror and passing at a refractive angle through said film, the portions of light reflected from each of the reflective portions of said mirror being effectively equal to the length of said sprocket hole, two separate light responsive means positioned in the respective paths of light from the upper and lower reflective portions respectively, and adapted to produce individual signals upon excitation by the light beam, the upper portion of the light beam reflecting from the upper portion of said mirror while said frame is in said second position and passing through said sprocket hole to one light responsive means, meanwhile the center portion of the beam is absorbed by the non-reflective portion of said mirror and the lower portion of the beam is refracted out of the path of both said light responsive means in passing through the film base, said sprocket hole being aligned with the non-reflective portion while said film is in said first position thus passing no light therethrough, and the sprocket hole being aligned with the lower reflective portion of the mirror when said frame is on the third position, thus passing light to the other said light responsive means.

4. A television transmission system in which the transport time between successive frames of film in a motion picture projector is greater than the blanking period between two successive fields in a camera tube, and arrangement for compensating this difference in time by controlling the relative movement between the projected image on the camera tube and the scanning trace, said arrangement comprising first means for initiating vertical shifting of said trace in either direction away from the normal pattern, optical switching means for controlling the operation of said first means said optical switch including a stationary light beam directed at a refractive angle toward said film and passing through a sprocket hole associated with the projected frame while said film is in a first position, said beam passing through the film base while the film is in a second position and being refracted thereby along a given path, third means responsive to said light beam when the film is in said first position for controlling the operation of said first means, said third means lying outside said given path thereby being non-responsive to the refracted beam whereby said first means is not controlled during the period said beam follows along said given path.

5. A television transmission system in which the transport time between successive frames of film in a motion picture projector is greater than the blanking period between two successive fields in a camera tube, an arrangement for compensating this difference in time by controlling the relative movement between the projected image on the camera tube and the scanning trace, said arrangement comprising a first means for initiating vertical shifting of said trace in either direction away from the normal pattern, optical switching means made effective when said film is in a first, second or third position, said optical switch including a mirror divided into three portions, the upper and lower portions being reflective and the center portion non-reflective, a thin beam of light directed toward said mirror and passing at a refracted angle through said film, the height of said beam being at least equal to the effective length of said mirror, and the portions of light reflected off each of the reflective portions of said mirror being effectively equal to the length of the sprocket hole associated with the projected frame, a second means positioned in the paths of light from the upper and lower reflective portions respectively and having the output thereof connected to said first means, the upper portion of the light beam reflecting off the upper portion of said mirror while said frame is in the first position and passing through said sprocket hole to control said first means to trace a first given portion of the frame during its movement before the completion of a transport period, meanwhile the central portion of the beam being absorbed by the non-reflective portion of said mirror and the lower portion of the beam being refracted out of the path of said third means in passing through the film base, the sprocket hole being aligned with the non-reflective portion while said frame is in the second position thus passing no light therethrough, and the sprocket hole being aligned with the lower reflective portion of the mirror when said frame is in the third position to control said first means to trace a second given portion of the frame during its movement at the start of the next transport period so that the relative movement between the projected image and the scanning trace is eliminated.

6. In a television transmission system including a motion picture projector, film having a sprocket hole associated with each frame, and a camera tube having means for vertically deflecting the scanning trace therein, an arrangement for controlling relative movement between the projected image on the camera tube and the scanning trace, comprising means for transporting each of said frames into two successive positions the frame being in the first position while it is fully gated and the projected image appears stationary relative to the scanning trace, the frame being in the second position while it is not completely gated and the film has a movement relative to the normal scanning trace, means for detecting said second position and supplying this information to the deflection means so that the scanning trace moves in accordance with the projected image while in the second position thereby eliminating the relative movement of the trace with respect to the projected image, said means comprising a beam of light passing at a refractive angle through said film, the height of said beam being at least as long as the sprocket hole, a photocell having its output connected to said deflecting means and positioned in the path of light, said light beam passing through said sprocket hole while said frame is in the first position thus energizing photocell to supply a signal to said deflecting means, and said light beam being sufficiently refracted in passing through the film base while said frame is in the second position to be out of the path of said photocell, whereby the photocell is energized to supply a compensating signal only when said film is moving relative to said scanning trace.

7. In a television transmission system including a motion picture projector, film having a sprocket hole associated with each frame, and a camera tube including means for vertically deflecting the scanning trace therein, an arrangement for controlling relative movement between the projected image on the camera tube and the scanning trace, comprising means for transporting each of said frames into two successive positions, the frame being in the first position while it is fully gated and the projected image appears stationary relative to the scanning trace, the frame being in the second position immediately before the gated position and the film has a movement relative to the normal scanning trace, means for detecting the second position and supplying this information to the deflection means so that the scanning trace moves in accordance with the projected image while in said position thereby eliminating the relative movement of the trace with respect to the projected image, said means comprising a mirror, a beam of light directed toward said mirror and passing at a refractive angle through said film, the height of said beam being effectively equal to the length of the sprocket hole associated with the projected frame, a photocell having its output connected to said deflecting means and positioned in the path of light from said mirror, said light beam reflecting off said mirror while said frame is in the first position and passing through said sprocket hole, thus energizing the photocell to supply a signal to said deflecting means, and said light beam being sufficiently refracted in passing through the film base while said frame is in the second position to be out of the path of said photocell, whereby the photocell is energized to supply a compensating signal only when said film is moving relative to said scanning trace.

8. In a television transmission system including a motion picture projector, film having a sprocket hole associated with each frame, and a camera tube including means for vertically deflecting the scanning trace therein, an arrangement for controlling relative movement between the projected image on the camera tube and the scanning trace, comprising means for transporting each of said frames into three successive positions, the frame being in the second position while it is fully gated and the projected image appears stationary relative to the scanning trace, the frame being in the first and third positions immediately before and after the gated position respectively, and the film has a movement relative to the normal scanning trace, means for detecting each of these positions by illuminating the sprocket hole associated with the projected frame and supplying this information to the deflection means so that the scanning trace moves in accordance with the projected image while in any one of said positions thereby eliminating the relative movement of the trace with respect to the projected image, said means comprising a mirror divided into three portions, the upper and lower portions being reflective and the center portion non-reflective, a thin beam of light directed toward said mirror and passing at a refractive angle through said film, the height of light from each of the reflective portions of said mirror being effectively equal to the length of the sprocket hole, first and second photocells having their output connected to said deflecting means and positioned in the paths of light from the reflective portions respectively, the upper portion of the light beam reflecting from the upper portion of said mirror while said frame is in the first position and passing through said sprocket hole thus energizing the first photocell to supply a first given signal to said deflecting means, meanwhile the center portion of the beam is absorbed by the non-reflective portion of said mirror and the lower portion of the beam is refracted out of the path of the second photocell in passing through the film base, said sprocket hole being aligned with the non-reflective portion while said frame is in the second position thus passing no light therethrough, and the sprocket hole being aligned with the lower reflective portion of the mirror when said frame is in the third position, thus energizing only the second photocell to supply a second signal to said deflecting means.

9. In a television transmission system including an intermittent motion picture projector, film having a sprocket hole associated with each frame, and a camera tube including means for vertically deflecting the scanning trace therein, an arrangement for controlling relative movement between the projected image on the camera tube and the scanning trace, comprising means for transporting each of said frames into three successive positions, the frame being in the second position while the film is stationary and the projected image appears stationary relative to the scanning trace, the frame being in the first and third positions while the film is moving and occurs immediately before and after the stationary position respectively and the film has a movement relative to the normal scanning trace, means for detecting each of these positions by illuminating the sprocket hole associated with the projected frame and supplying this information to the deflection means so that the scanning trace moves in accordance with the projected image while in any one of said positions, thereby eliminating the relative movement of the trace with respect to the projected image, said means comprising a mirror divided into three portions, the upper and lower portions being reflective and the center portion non-reflective, a thin beam of light directed toward said mirror and passing at a refractive angle through said film, the height of said beam being at least equal as the effective length of said mirror, the portions of light from each of the reflective portions of said mirror being effectively equal to the length of the sprocket hole, first and second photocells having their output connected to said deflecting means and positioned in the paths of light from the reflective portions respectively, the upper portion of the light beam reflecting off the upper portion of said mirror while said frame is in the first position and passing through said sprocket hole, thus energizing the first photocell to supply a first signal to said deflecting means, meanwhile the center portion of the beam being absorbed by the non-reflective portion of said mirror and the lower portion of the beam being refracted out of the path of the second photocell in passing through the film base, said sprocket hole being aligned with the non-reflective portion while said frame is in the second position thus passing no light therethrough, and the sprocket hole being aligned with the lower reflective portion of the mirror when said frame is in the third position thus energizing only the second photocell to supply a second signal to said deflecting means.

References Cited in the file of this patent

UNITED STATES PATENTS

| | | |
|---|---|---|
| 1,969,465 | Jones | Aug. 7, 1934 |
| 2,243,047 | Foster et al. | May 20, 1941 |
| 2,262,051 | Sabol | Nov. 11, 1941 |
| 2,429,066 | Kuehni | Oct. 14, 1947 |
| 2,485,594 | Hallmark | Oct. 25, 1949 |
| 2,506,198 | Charles | May 2, 1950 |
| 2,523,156 | Somers | Sept. 19, 1950 |

UNITED STATES PATENT OFFICE

CERTIFICATE OF CORRECTION

Patent No. 2,818,467 December 31, 1957

Samuel J. Harris et al.

It is hereby certified that error appears in the printed specification of the above numbered patent requiring correction and that the said Letters Patent should read as corrected below.

Column 5, line 28, strike out "position".

Signed and sealed this 18th day of February 1958.

(SEAL)
Attest:

KARL H. AXLINE
Attesting Officer

ROBERT C. WATSON
Commissioner of Patents